(12) United States Patent
Peach (10) Patent No.: US 6,571,818 B2
(45) Date of Patent: Jun. 3, 2003

(54) DAMAGE RESISTANT BREAK AWAY VALVE STEM

(75) Inventor: Gregory L. Peach, Englewood, FL (US)

(73) Assignee: Peach/Wheeler Associates, LLC, Englewood, FL (US)

(*) Notice: Subject to any disclaimer, the term of this patent is extended or adjusted under 35 U.S.C. 154(b) by 0 days.

(21) Appl. No.: 09/884,685

(22) Filed: Jun. 19, 2001

(65) Prior Publication Data

US 2002/0189670 A1 Dec. 19, 2002

(51) Int. Cl.$^7$ ............................................. F16K 15/20
(52) U.S. Cl. .................... 137/223; 137/68.12; 137/529; 152/427
(58) Field of Search ........................... 137/68.11, 68.12, 137/72, 74, 223, 234.5, 529, 541; 152/427

(56) References Cited

U.S. PATENT DOCUMENTS

| | | | | |
|---|---|---|---|---|
| 586,752 A | * | 7/1897 | Bagot | ........................... 152/427 |
| 1,629,901 A | * | 5/1927 | Ahearn | ..................... 137/234.5 |
| 1,798,536 A | * | 3/1931 | Hofmann | ..................... 137/529 |
| 2,621,700 A | | 12/1952 | Snyder | |
| 3,157,219 A | | 11/1964 | Dimin et al. | |
| 3,289,686 A | * | 12/1966 | Tyer, Jr. | ....................... 137/529 |
| 3,797,510 A | | 3/1974 | Torres et al. | |
| 3,863,697 A | | 2/1975 | Brown | |
| 3,916,929 A | | 11/1975 | Brown | |
| 4,365,643 A | * | 12/1982 | Masclet et al. | .............. 152/427 |
| 4,628,953 A | | 12/1986 | Correll et al. | |
| 4,674,525 A | | 6/1987 | Richards et al. | |
| 4,718,639 A | | 1/1988 | Sherwood et al. | |
| 4,886,087 A | | 12/1989 | Kitchen | |
| 4,899,792 A | | 2/1990 | Podgers | |
| 5,211,202 A | | 5/1993 | Zink et al. | |
| 5,257,642 A | | 11/1993 | Worth | |
| 5,357,998 A | | 10/1994 | Abrams | |
| 5,529,085 A | | 6/1996 | Richards et al. | |
| 5,694,969 A | * | 12/1997 | DeVuyst | ...................... 152/427 |
| 5,699,822 A | | 12/1997 | Bodhaine | |
| 5,765,587 A | | 6/1998 | Osborne | |
| 5,791,366 A | | 8/1998 | Lo | |
| 5,988,245 A | | 11/1999 | Rosenberg | |
| 6,034,596 A | | 3/2000 | Smith et al. | |
| 6,260,569 B1 | | 7/2001 | Abrams | |

* cited by examiner

*Primary Examiner*—John Rivell
(74) *Attorney, Agent, or Firm*—Nixon Peabody LLP; Thomas W. Cole (57) ABSTRACT

A tire air pressure valve is described that has an air sealing surface that is protected inside the metal wheel of a vehicle. The valve has an external stem with a built in break away feature which prevents external damage to the valve stem from damaging the sealing surface located inside the tire and wheel. The location of the seating/sealing surface inside the wheel, as compared to the top of the valve stem, provides protection from collision induced sudden tire pressure loss due to valve damage incurred during collisions or simply being struck by an object in a car wash or on the street.

33 Claims, 3 Drawing Sheets

DAMAGE RESISTANT BREAK AWAY VALVE STEM

BACKGROUND OF THE INVENTION

1. Field of the Invention

This application is generally directed towards pressure valves, and more particularly to a valve for inflatable tires.

2. Description of Related Art

Automotive rollover accidents due to tire blowouts are a major concern in the automotive, trucking, bussing and racing industries. Most recently the Firestone/Ford Explorer rollover problems have been of major concern to the public and industry, and have been at least partially attributed to tire blowouts. In addition to the bad publicity, the lost business, the loss in public good will and confidence, and the high costs of tire and automobile recalls may represent major financial costs to tire and automobile manufacturers. Thus any improvement in actual or publicly perceived tire quality would be a benefit.

The tire inflation valve, which is likely to be the least expensive part of any vehicle, is one potential cause of catastrophic tire failures. This is because the valve stem of the tire inflation valve necessarily protrudes from the metal (for example steel or aluminum) wheel to enable inflation and deflation of the tire by the operator or service person. The protruding valve stem contains the valve sealing surface near the tip of the valve stem. This is so that the control actuator of the valve sealing surface may be accessed by the inflation nozzle that is applied to the tip of the valve stem. As a result of the location of the sealing surface, any damage to the valve stem that occurs below the level of the valve sealing surface results in sudden and complete deflation of the tire. Any vehicle that loses pressure in any one of its tires results in an unbalanced condition that adversely affects the handling of the vehicle. Such loss of handling efficiency may result in a loss of control of the vehicle by the operator, with understandable bad consequences to the operator, passengers or bystanders. Such loss of control instances may also represent a large economic loss or injury to the vehicle operators and to anybody else who is involved in the incident, for example bystanders.

The commonly used valve stems in automotive wheels may be rubber molded tubes that surround threaded brass valve bodies into which valves are screwed. The valve stems are designed to be inserted through the metal wheel rim from what will be the inside of the tire. If the portion of the tire valve stem that protrudes from the metal wheel impacts an object such as a rock or a curb, the portion of the tire valve stem that is torn or ripped off may contain the valve body with the sealing surface, and thus result in sudden tire deflation. In addition, an impact may completely rip the entire valve stem out of the steel wheel rim, thus also resulting in sudden tire deflation, and thus provoking a potentially life-threatening incident. Such damage and impact may also be due to acts of vandalism such as striking the very exposed valve stem with a knife or hammer. The damage may result in immediate loss of tire pressure, which may be easily noticed, or it may result in a weakened valve stem, that is not easily noticed, which weakened valve stem may suddenly rupture during high speed driving, resulting in a loss of control incident.

The extent of this problem may be seen in the attempts made to prevent sudden loss of tire pressure in the NASCAR race circuit. It is known that at the high speeds the typical racecar tire filled with nitrogen may have steel valve stem ruptures or failures that may occur upon any substantial contact with another car, side barriers or curbs. As a result some racecars have tires that contain a separately inflated inner tire so that the loss of pressure in a valve stem rupture accident is not complete, and thus the driver may maintain control of the vehicle. However, the inner tire adds weight to the vehicle, and thus slows the car down and affects the ability to turn. In addition, the inner tire may only last a short time before it also deflates, is thus not a solution to the valve stem rupture sudden deflation problem.

The problem of sudden deflation is not simply a racecar or automobile collision problem, but may also occur during normal traffic instances, such as highway driving on hot road surfaces resulting in increased tire pressure and thus possible valve stem rupture at either a manufacturing flaw or the site of a prior cut or impact, such as by a rock. This is because, as noted above, that the valve stem may be made of rubber with a metal valve body near the external tip. Thus an increased gas pressure inside the tire may be transmitted to the hollow valve stem at the portion below the valve that is still outside the metal wheel, which due to previous damage or manufacturing defect may then rupture.

The valve stem may rupture even if it is not made of rubber. Brass or steel valve stems may be attached to the metal wheel rim using sealing rings and nuts on either or both of the outside and inside of the wheel. Such metallic valve stems are also subject to damage due to impacts, rocks and vandalism, and further may be susceptible to thermal expansion mismatch, corrosion, repetitive bending and vibrations which may cause stress cracking. These cracks and defects may be hidden from view on the inner surface of the valve stem, or at the juncture of the valve stem and metal wheel, until the valve stem suddenly breaks under the influence of some event and the tire pressure is abruptly lost.

The problem of accidental damage to inflation/deflation valves is not limited to automobile tires. Any inflated object may have a valve that when damaged may cause the object to suddenly lose pressure and deflate, often with serious repercussions. Pressurized vessels and tanks also may have external valves that allow for either pressurization or for venting. The possibility of damage to the external valve may result in loss of the contents of the vessel or tanks, with potential for substantial damage to the tank or the surrounding environment. Examples of such tanks or vessels include compressed natural gas tanks and tanker trucks, chemical tankers transporting or storing liquids such as acids, alkali materials, chlorine bleach, mercaptans, pesticides, herbicides, radioactive or industrial wastes, the accidental release of which would clearly be a major problem. Other gaseous materials include various petroleum gases, hydrogen sulfide, hydrogen cyanide, sulfur dioxide, and fluorcarbons, all of which may be regularly transported by truck or train tankers, or stored in tanks in the manufacturing plants, in the ordinary course of manufacturing business, but are also deadly to the environment if released. Thus the normal transportation and storage of liquids and gases may involve the use of valves of the type discussed herein for accessing and removing gases, and for pressurizing tanks with inert or ordinary gases for safe storage and transportation, and for improved speed of off loading of various liquid materials. Any of these valves may be damaged by collisions, corrosion, accidental impacts or other damage, and result in the inadvertent release of potentially hazardous materials.

Thus it would be a benefit to automobile tire users and users of pressurized vessels and tanks to provide a valve that does not open when damaged due to accidents, overpressure situations, manufacturing defects, or accidental impacts.

SUMMARY OF THE INVENTION

An illustrative embodiment of the valve disclosed herein describes a valve comprising a valve stem, a valve body coupled to the valve stem and having a valve sealing surface with a valve sealing element disposed proximate to the sealing surface. A portion of the valve body is disposed to seal the valve stem to an aperture in a chamber that has an inside surface and an outside surface, and there is an elastic material biasing the sealing surface with respect to the sealing element. The sealing surface, the sealing element and the elastic member are disposed inside the chamber.

Alternative arrangements of the first illustrative embodiment of the valve disclosed herein describe a valve stem that has a weakened portion disposed at a location of the valve stem outside of the chamber. The valve stem weakened portion may have a location that is further from the chamber compared to the portion of the valve body that is disposed to seal the valve stem to the aperture in the chamber. The elastic member may be disposed to urge or bias the sealing element against the sealing surface with a predetermined force. The elastic member may be sensitive to a pressure difference between the inside of the chamber and the outside of the chamber, and upon the pressure difference exceeding a predetermined level, the elastic member may cease to urge the sealing element against the sealing surface. There may be a second elastic member disposed to urge the sealing element away from the sealing surface with a predetermined second force that is less than the predetermined force of the elastic member, and greater than a force required to separate the sealing element from the sealing surface against the predetermined pressure difference between the inside of the chamber and the outside of the chamber, in the absence of the urging of the elastic member. The elastic member may be sensitive to the temperature in the chamber, and upon the temperature exceeding a predetermined level, the elastic member may cease to urge the sealing element against the sealing surface. The second elastic member may be disposed to urge the sealing element away from the sealing surface with a predetermined second force that is less than the predetermined force of the elastic member, in the absence of the urging of the elastic member.

There may further be a hollow tubular cap disposed upon the end of the valve stem most distant from the valve base that includes a member disposed to enable the valve actuator to displace the sealing element to a location removed from contact with the sealing surface, resulting in a normally open valve. The cap member may be temperature sensitive and/or pressure differential sensitive, and upon the temperature or pressure exceeding a predetermined level, the cap member ceases to displace the sealing element away from the sealing surface. The chamber may contain a compressed gas, a combination of gases, a pressurized gas in at least partly liquid form, a liquid material having at least one of an inert or a non inert pressurized gas, and/or a pressurizable fluid.

In another illustrative embodiment of the valve disclosed herein there is a tire valve that comprises a valve stem, a valve body coupled to the valve stem with a valve sealing surface, a valve sealing element disposed proximate to the sealing surface, a valve actuator disposed to change a position of the sealing element with respect to the sealing surface, a spring biasing (e.g.; pushing or pulling) the sealing element against the sealing surface. There is a portion of the valve body disposed to seal the valve stem to an aperture in a wheel disposed to have a pneumatic tire installed thereon. The sealing surface, the sealing element and the spring are all disposed inside the surface of the wheel, and the valve stem has a weakened location disposed further outside of the wheel as compared to the portion of the valve body disposed to seal the valve stem to the wheel.

Alternative arrangements of the second illustrative embodiment of the valve disclosed herein describe a spring that pushes the sealing element against the sealing surface with a predetermined force. The spring may be sensitive to a pressure difference between the inside of the wheel and the outside of the wheel, and upon the pressure difference exceeding a predetermined level, the spring ceases to push the sealing element against the sealing surface with the predetermined force. There may further be a second spring disposed to bias or urge the sealing element away from the sealing surface with a predetermined second force that is less than the predetermined force, and greater than a force required to separate the sealing element from the sealing surface against the tire pressure difference, in the absence of the pushing of the spring. The first spring may be sensitive to the temperature in the wheel, and upon the temperature exceeding a predetermined level, the spring may melt and/or lose spring strength, and ceases to urge the sealing element against the sealing surface. There may further be a second spring disposed to urge the sealing element away from the sealing surface with a predetermined second force that is less than the predetermined force of the spring, and greater than a force required to separate the sealing element from the sealing surface against a pressure difference between the inside and outside of the wheel, in the absence of the urging of the spring. There may be a hollow tubular cap disposed upon an end of the valve stem most distant from the wheel that includes a member disposed to enable the valve actuator to displace the sealing element to a location removed from contact with the sealing surface, resulting in a normally open valve. The cap member may be a temperature sensitive and/or a pressure differential sensitive element, and upon the temperature or pressure exceeding a predetermined level, the cap member ceases to displace the sealing element away from the sealing surface. The wheel may be filled with compressed air, nitrogen, an inert gas, a reactive gas, and/or a combination of gases.

In a third illustrative embodiment, there are disclosed means for controllably sealing a chamber having a hollow stem, a body coupled to the hollow stem and having means for sealing a sealing surface against a sealing element disposed proximate to the sealing surface. There are means for biasing the sealing surface with respect to the sealing element, and the sealing surface, the sealing element and the biasing means are disposed within the protection of the chamber.

Alternative arrangements of the third illustrative embodiment include that the stem has means for stem breakaway disposed at a location of the stem outside of the chamber. The means for biasing may include a spring, an elastic material, a magnetic field, a fluid pressure differential, a remotely monitored electronic device, a remotely controlled electronic device, a remotely monitored electromechanical device, and a remotely controlled electromechanical device, and may bias the sealing element against the sealing surface with a predetermined force. The means for biasing may be sensitive to a temperature and/or a pressure difference between a region inside of the chamber and a region outside of the chamber and may include a second means for biasing disposed to bias the sealing element away from the sealing surface with a predetermined second force that is less than the predetermined force. There may be an externally controllable actuator resulting in a normally open valve, and it may be temperature or pressure sensitive.

DETAILED DESCRIPTION OF ILLUSTRATIVE EMBODIMENTS

In general terms, the valve disclosed herein comprises a tire or other container air or gas pressure valve that has an sealing surface that is inside the wheel or pressure chamber, for example a vehicle having pneumatic tires on a metal wheel. The valve stem extends outside of the wheel or chamber for access purposes, and may have a built in break away feature so that damage to the valve stem occurring outside of the wheel or chamber causes stress to only the external portion of the valve, and not to the sealing surface inside the tire and wheel. Thus inadvertent damage to the valve does not result in loss of chamber or wheel pressure. Such an arrangement (i.e., the location of the sealing surface being inside the protection of the wheel or chamber, plus the built in breakaway feature) provides protection from catastrophic tire or chamber pressure loss due to valve damage from accidents or simply being struck by an object in a car wash, on the street or by workers and passersby.

Figure 1:
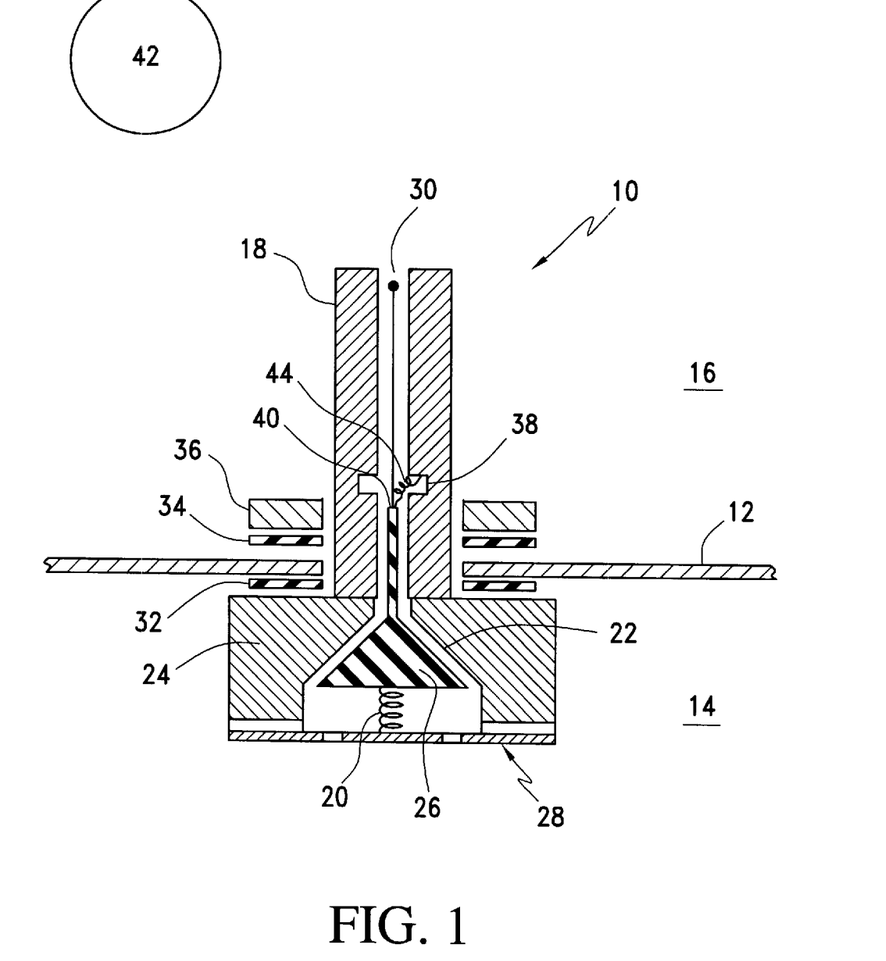
FIG. 1 is a cross section view of a normally closed embodiment of the claimed valve that may have an over temperature safety response.

Referring now to FIG. 1, a pressure valve, generally denoted 10, is attached to an aperture in the wall of a chamber 12. The valve is shown in an open configuration in order to simplify the identification of the individual parts of the valve. In normal operation there would not be a clear path for fluid to flow through the valve 10 from the one side of the chamber wall 12 to the other. The chamber may be the metallic wheel of an automobile or truck, often made of steel or an aluminum alloy, with an elastic tire attached to the wheel 12 to complete the pressure chamber. The walls of the pressure chamber may also comprise an insulative material such as ceramic or glass as well as metals such as steel, aluminum, titanium or alloys of various metals. The specific material used may depend upon the specific use of the pressure chamber, for example glass or quartz is often used in vacuum chambers, which is another application for pressure valves of the type described herein. The chamber enclosed by the wall 12 will have an interior portion 14 which may contain a vacuum, pressurized gases, liquids, pressurized liquids or liquids under reduced pressures, and an exterior portion 16 which may be exposed to the outside environment, such as the atmosphere. For example, liquids may need to be stored under a protective atmosphere of an inert gas for long term stability. Alternately, liquid materials may be stored under pressure to improve the rate of unloading.

As noted previously, the valve 10 will include a valve stem 18 that extends away from the pressure chamber wall 12 to allow fluids to be controllably inserted from an external fluid source 42 through the hollow valve stem 18, past the sealing element 20, and thus into the interior 14 of the chamber. For example, a driver may use the valve 10 to add compressed air to the inside 14 of a vehicle pneumatic tire, until the internal pressure of the tire exceeds the external air pressure by a specified amount, thus controlling the weight load and lateral resistance and traction of the tire, among other tire properties. The valve stem being external to the protection of the interior 14 of the pressure chamber results in the potential for unintentional damage, or for increased ease of intentional damage. In the valve type commonly used in the industry for vehicle tires and pressurized fluid carriers, damage such as impacts, repetitive bending or vibrations, and cuts by sharp objects, may result in the valve stem 18 losing pressure integrity at a location below the sealing surface, which is often located at a position near the open tip of the valve stem 18 for reasons of ease of manufacture and use. If the valve loses pressure integrity below the sealing surface represented by the sealing element 20 and the sealing surface 22, then the interior of the chamber 14 may be in communication with the external environment 16, and the pressures may begin equalize at a rate determined in part by the size of the communicating opening. For example, a pressurized auto tire may deflate from 40 psi to zero pressure relative to the external atmospheric pressure, and thus the tire will go flat since there is no longer any internal pressure to counteract the weight of the vehicle.

The valve 10 may be made of many different materials such as rubber or elastomers for automotive tires, brass or steel for high pressure chambers, or titanium for corrosive materials. In all cases there is a possibility of the valve, for example at the valve stem, developing a loss of pressure integrity due to impact, cutting or repetitive stresses. Metals may be more susceptible to repetitive stresses such as bending or vibrations, and elastomers may be more susceptible to sharp edge cutting and manufacturing defects that may blow out during over pressure situations such as a tire hitting a curb.

The sealing element 20 may be pressed against the sealing surface 22 of the valve body 24 by a elastic member such as a spring 26. The spring 26 may push against the sealing element 20 by being attached or held against a perforated plate 28 that is attached to the valve body 24. This is what is known as a normally closed valve, since in the absence of some external action, the passage from the interior of the chamber 14 to the exterior 16 is substantially blocked by the closely mating surfaces of the sealing element 20 and the sealing surface 22 of the valve body 24. There are numerous other well known methods to form a controllable seal, such as ball valves, poppet valves and various different shapes for the sealing surfaces, as well as different types of mating surfaces such as elastic, ground glass, polished metal, any of which will easily be seen by one of skill in the art to have application to the present arrangement, depending upon the materials and pressures to be utilized in the specific application. The arrangement of FIG. 1 is intended to provide a single illustrative embodiment to aid in the description of the present valve.

In normal operation the spring 26 holds the valve 10 in a closed position, that is the sealing element 20 is held against the sealing surface 22 with sufficient force to substantially prevent fluid from communicating between the chamber interior 14 and the exterior 16. To open the valve 10, an actuator element 30 may be depressed at the distal end of the valve stem 18. Depressing the actuator 30 results in a force overcoming the spring 26 and removing the sealing element 20 from the vicinity of the sealing surface 22, resulting in an open channel for fluids to flow under the control of either an external source of pressurized fluid 42 or the pressure differential between the interior 14 and the exterior 16. The actuator shown is for illustrative purposes only, and the present description is not limited to simple mechanical methods of controllably displacing the sealing element. Electromechanical methods and magnetic methods of moving the sealing element may be mentioned as optional alternatives to that shown.

The valve 10 may be designed to fit into an aperture in the wall 12 from the inside 14 of the chamber. The aperture may be sealed by interior and exterior seals 32 and 34, positioned between the valve body 24, which may be too large to fit through the aperture in the wall 12, and a sealing attachment element 36, such as a nut that fits to a threaded surface of the valve stem 18. Optionally, the valve body 24 and valve stem 18 may be fabricated as a single piece, and the sealing of the tire valve in the aperture may be performed by what is known as a press fit, or in the case of an elastomer valve body and/or stem, the seal with the aperture may be formed by means of pushing a portion of the valve having a ridge slightly wider than the aperture through the aperture to a location of the valve that is at roughly the same diameter as the aperture.

With the described arrangement, inadvertent damage to the external portion of the valve stem 18 may not result in damage to the sealing surface 22, and thus the sealing element 20 continues to control the access to the interior of the chamber. This would for example, prevent a race car involved in a crash from suffering an additional problem of one of more tires blowing out, resulting in potential loss of control of the vehicle during the critical time period immediately following the crash. Thus such an arrangement would be an improvement over the valves currently used in the racing industry, and provide an improvement by reducing damage incurred after the initial contact.

In addition, it is possible to imagine collisions where the external pressure on the valve stem is sufficient to completely rip the entire valve body out of the wall 12, for example, rubber press fit tire valves may be pulled out of the steel or aluminum wheel wall of a normal automotive wheel, even though the rubber valves have a thick valve base that is located inside of the wheel. In such an extreme case the above described valve, even though the sealing surface is protected inside the wheel, would still result in a sudden loss of tire pressure and the concomitant loss of vehicle control. For this situation a optional feature of the present valve disclosed herein provides that the valve stem 18, at a preselected location that is beyond that portion of the valve stem involved in attaching the valve 10 to the chamber wall 12, (i.e., the seals 34 and nut 36 in the figure) has an optional built in weak region 38 that breaks off at a pressure that is less than a pressure that is likely to remove the entire valve 10 from the aperture in the chamber wall 12. With such an arrangement, if a situation arises where the impact is so large as to damage even a sealing surface that is protected within the chamber wall 12, the strain on the sealing surface is maintained at a level below the damage threshold by the built in breakaway region 38. Preferably, the breakaway region 38 is located as close as possible to the surface of the chamber wall 12 as possible, without interfering with the valve 10 attachment to the chamber wall shown in this illustrative embodiment as elements 34 and 36, in order to improve the probability that an impact will not affect the near side (i.e., the side closest to the interior 14) of the breakaway region 38.

In another optional embodiment of the valve disclosed herein, there may be another spring 44 that contacts the top 40 of the sealing element 20 and may be attached at the breakaway region 38, for pressing the sealing element 20 away from the sealing surface 22 of the valve body 24. Preferably, the second spring 44 would have less force than the first spring 26 so that the valve would remain in a normally closed condition unless the actuator element 30 was depressed. Such an arrangement might be beneficial in the example of an over temperature situation. An increase in temperature naturally results in an increase in tire pressure. A known problem in the art is that airplane tires get very hot during the sudden impact of landing and braking procedures. As a result there are numerous instances of airplanes that land and have the tires blow out from a few seconds after contacting the runway, to as much as 10 minutes after landing. Such blowouts are an obvious problem if they occur during the slow down period immediately after landing since loss of control, which in large part depends upon the braking of the wheels by the pilot, may result in a major crash. It is also a problem if the blowout occurs during the slow speed entry into the gate area, since the sudden swerving of the aircraft into the terminal building may also be very damaging. For such a problem the spring 26 may be made of a heat sensitive material that losses, either permanently or temporarily, spring strength and thus allows the second spring 44 to open the valve, thus releasing the potentially damaging overpressure inside the aircraft tire, and avoiding the tire overpressure problem due to the over heating. The spring may be made of a material that melts at a specified temperature, and thus completely removes the spring force holding the sealing surface 22 to the sealing element 20, and resulting in the second spring 44 forcing the valve open against the pressure differential between the inside region 14 and the outside region 16. The tire will deflate in this example, but slowly since the air is escaping through the valve stem 18 at a controlled rate. Thus there may be no sudden loss in control over the aircraft by the pilot. Alternatively, the spring 26 may be made of a metal that temporarily losses spring strength as it heats up. As pressure is lost in the tire, the temperature within the tire naturally goes down, which would result in the spring 26 regaining the previous spring strength, and thus again closing the valve. In this example the tire will only loss some of its pressure, as measured during the normal cold state, but no loss of aircraft control should result. It is also easily possible to imaging electronic devices that might control the location of the sealing element 20 in response to conditions such as temperature or pressure inside the tire, thus reducing the probability of sudden pressure loss due to tire rupture.

Figure 2:
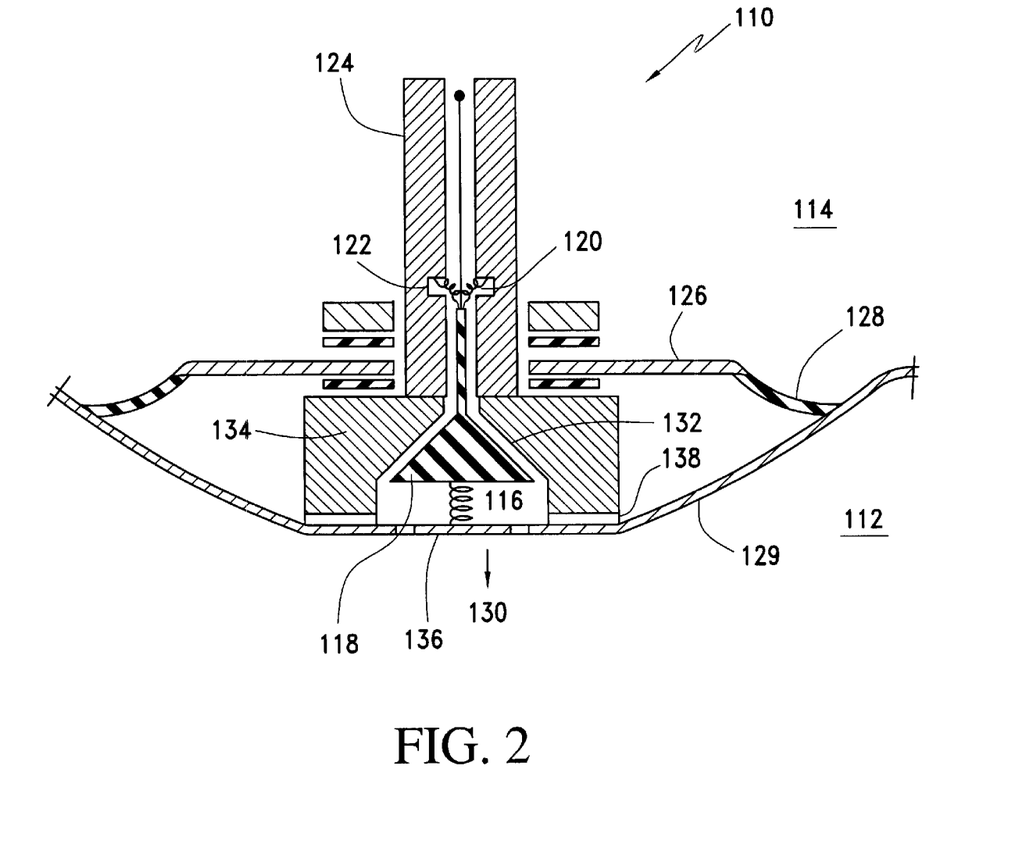
FIG. 2 is a cross section view of an over pressure embodiment safety response of the claimed valve.

Referring now to FIG. 2, another embodiment of the valve 110 is shown that reacts to a pressure differential between the interior region 112 and the exterior region 114 by reducing the pressure of the spring 116 on the sealing element 118, thus resulting in the second spring 120 opening the valve to partially equalize the internal and external pressures. In this embodiment, a mechanical method of reacting to an internal overpressure is described. There are numerous additional methods that may be used such as the use of an electronic, magnetic or electromechanical devices, which may be remotely monitored and/or controlled. The secondary springs 120 are shown in this embodiment as being anchored in the breakaway portion 122 of the valve stem 124, but the valve disclosed herein is not limited to having a secondary spring in this location, which is chosen for simplicity of the drawing. The pressure chamber wall 126 has flexible diaphragms 128 that are attached to the main spring 116 flexible attachment plate (reference numbers 129 and 136 combined), which may be perforated to permit fluid communication within that portion of the chamber area. As the diaphragms 128 move toward the exterior 114 under the increased pressure of the interior 112, the portion of attachment plate 129 that is beyond the fulcrum 138 of the valve body 134 will flex downward in the direction 130, thus reducing the spring pressure of the spring 116 on the sealing element 118 towards the sealing surface 132. When the pressure differential reaches a specified level, set by the flexibility of the diaphragms 128, the spring strength of spring 116 and the spring strength of springs 120, the sealing element 118 will separate from the sealing surface 132, and the valve will be in an open condition. This figure shows an illustrative embodiment of a mechanical over pressure safety valve that will return to the normal closed state when the over pressure situation ends. Thus a situation such as the aircraft tire over temperature and pressure condition during landing and high speed taxiing mentioned previously, may be reduced or eliminated without sudden and complete loss of tire pressure, and without permanent damage to the tire, as may occur when running a tire in the flat condition.

An alternative mechanical embodiment with fewer moving parts may be imagined in which the valve stem 124 is attached to the wall 126 of the chamber as previously discussed, but not attached to the valve body 134 which contains the sealing surface 132, which is now movable. In this embodiment the secondary springs 120 firmly attach the sealing element 118 to the valve stem 124 and provide part of the biasing of the sealing element 118 with respect to the movable sealing surface 132. Spring 116 is attached to optionally non-movable attachment plate 136, which maybe firmly connected to the chamber wall 126 in a direction out of the plane of the figure. The element 129 is not attached to the attachment plate 136 in this embodiment, but is securely attached to the valve body 134, for example at point 138. The element 129 does not need to be flexible, and moves the valve body 134 up and down with respect to the valve stem 124 in concert with the movement of the diaphragms 128. Thus, as the pressure inside the chamber at 112 increases, the diaphragms 128 move upwards toward the region 114, the valve body attachment element 129 moves upward, and the valve body 134 moves upward, and consequently the valve sealing surface 132 moves away from the valve sealing element 118, which is attached to the valve stem 124 by elements 120. Thus the only moving part in this embodiment of a mechanical over pressure relief valve is the combination of the valve body 134, the attachment element 129 and the diaphragms 128.

Figure 3:
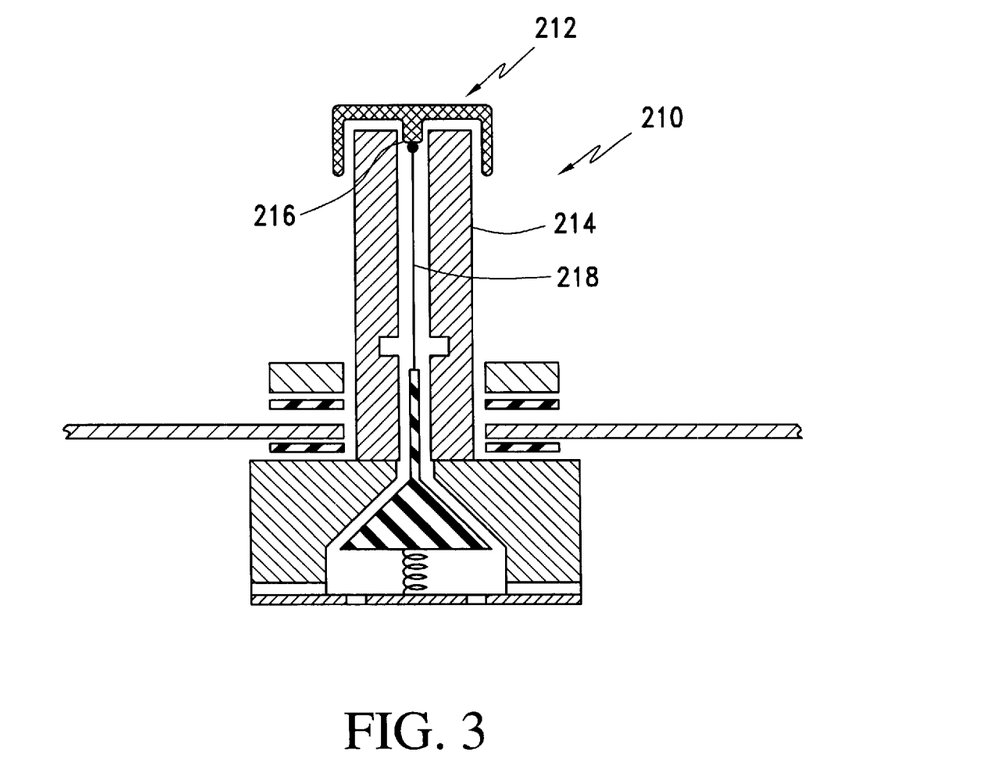
FIG. 3 is a cross section view of a normally open embodiment of the claimed valve.

Referring now to FIG. 3, a normally open valve 210 is shown, which is structurally similar to the normally closed valves of the previous figures, but with a cap 212 that is attached to the valve stem 214, for example by a threaded structure on the valve stem 214. The cap 212 has an element 216 that depressed the valve actuator 218 when screwed on to a sufficient level, or attached at an appropriate location by some other means. The valve actuator depressing element 216 may also easily be seen to possibly be built into the valve stem 214, for example as a projection from the inner surface of the valve stem rather than projecting from the cap 212 as shown. The present invention is not limited to the presence of a valve cap in the normally open case illustrated in this figure, and the member 216 may be easily seen to be located in various positions depending upon the design requirements of the specific situation. For example, the normally open valve may be used in a storage tank situation where the outflow of gas in either a normal or emergency situation is not permitted to vent to the atmosphere, and would then pass through the valve tube 214 to a pipe or overflow containment vessel. In either case, this arrangement results in a normally open valve that may be used as a safety valve or a pressure relief valve. The cap 212 may not completely cover or seal the open end of the valve stem (as in for example the previously mentioned overflow tank case), and may be perforated to allow controlled amounts of fluid to pass. Similarly to the previously disclosed illustrative embodiments, the cap 212 and/or the element 216 may be made of a temperature, chemical or pressure sensitive material so that the normally open valve shown may become a normally closed valve when the element 216 ceases to press the valve actuator 218 to the open position. The element 216 may clearly further be an externally operated and/or monitored electronic, magnetic or electromechanical element to provide a controllable open and close switching action.

In summary, the features of the valve disclosed herein, as shown in the attached figures, include that the location of the air valve sealing surfaces may be at or around the bottom of the valve stem and predominantly inside of the chamber wall (typically metal or other solid material). The valve stem may have a built in "break away" region that leaves the valve sealing surfaces intact after collision damage to the valve stem. The break away region cut location may be located at approximately the level of the exposed surface of the chamber or wheel wall. There may be multiple break away regions built into the valve. The valve stem and other valve parts may be variously fabricated of plastic, rubber, elastomers or metals such as brass, bronze, beryllium bronze, steel, stainless steel or titanium. The sealing elements may be biased away from, or against the sealing surface without the use of springs or elastomers, by means of the pressure differential, magnetic force or electrostatic forces.

While the valve has been disclosed in connection with the preferred embodiments shown and described in detail, various modifications and improvements thereon will become readily apparent to those skilled in the art. Accordingly, the spirit and scope of the present disclosure is to be limited only by the following claims.

What is claimed is:

1. A valve for sealing a chamber comprising a valve stem, a valve body coupled to the valve stem and having a valve sealing surface, a valve sealing element disposed proximate to the sealing surface, and an elastic material that biases the sealing surface with respect to the sealing element, wherein the sealing surface, the sealing element and the elastic member are disposed within the chamber, wherein further the valve stem has a weakened portion disposed at a location of the valve item outside of the chamber, and the valve stem weakened portion has a location that is further from the chamber as compared to a portion of the valve body seal the valve stem to an aperture in the chamber.

2. The valve according to claim 1, wherein further the elastic member is disposed to bias the sealing element against the sealing surface with a predetermined force.

3. The valve according to claim 2, wherein further the elastic member is sensitive to a pressure difference between an inside region of the chamber and a region outside of the chamber, and upon the pressure difference exceeding a predetermined level, the elastic member ceases to bias the sealing element against the sealing surface with the predetermined force.

4. The valve according to claim 3, wherein further a second elastic member is disposed to bias the sealing element away from the sealing surface with a predetermined second force that is less than the predetermined force of the elastic member, and greater than a force required to separate the sealing element from the sealing surface against the predetermined pressure difference between the inside of the chamber and the outside of the chamber, and against a remaining biasing of the elastic member.

5. The valve according to claim 2, wherein further the elastic member is sensitive to a temperature in a region inside the chamber, and upon the temperature exceeding a predetermined value, the elastic member ceases to bias the sealing element against the sealing surface with the predetermined force.

6. The valve according to claim 5, wherein further a second elastic member is disposed to bias the sealing element away from the sealing surface with a predetermined second force that is less than the predetermined force of the elastic member, and sufficient to separate the sealing element from the sealing surface.

7. The valve according to claim 1, wherein further a hollow tubular cap disposed upon an end of the valve stem most distant from the valve base includes a member disposed to enable a valve actuator to displace the sealing element to a location removed from contact with the sealing surface, resulting in a normally open valve.

8. The valve according to claim 7, wherein further the cap member disposed to result in a normally open valve comprises at least one of a temperature sensitive and a pressure differential sensitive element, and upon at least one of a temperature or a pressure exceeding a predetermined level, the cap member ceases to displace the sealing element away from the sealing surface.

9. A tire valve comprising a valve stem, a valve body coupled to the valve stem and having a valve sealing surface, a valve sealing element disposed proximate to the sealing surface, a valve actuator disposed to change a position of the sealing element with respect to the sealing surface, at least one spring biasing the sealing element with respect to the sealing surface, and a portion of the valve body disposed to seal the valve stem to an aperture in a wheel disposed to have a pneumatic tire installed thereon, wherein:

the sealing surface, the sealing element and the spring are disposed within the inside surface of the wheel; and the valve stem has a weakened location disposed further outside of the wheel as compared to the portion of the valve body disposed to seal the valve stem to the wheel.

10. The tire valve according to claim 9, wherein further the spring pushes the sealing element against the sealing surface with a predetermined force.

11. The tire valve according to claim 10, wherein further the spring is sensitive to a pressure difference between the inside of the wheel and the outside of the wheel, and upon the pressure difference exceeding a predetermined level, the spring ceases to push the sealing element against the sealing surface with the predetermined force.

12. The tire valve according to claim 11, wherein further a second spring is disposed to urge the sealing element away from the sealing surface with a predetermined second force that is less than the predetermined force, and greater than a force required to separate the sealing element from the sealing surface against the predetermined pressure difference, in the absence of the pushing of the spring with the predetermined force.

13. The tire valve according to claim 10, wherein further the spring is sensitive to a temperature in the wheel, and upon the temperature exceeding a predetermined level, the spring at least one of melts or loses spring strength, and ceases to urge the sealing element against the sealing surface with the predetermined force.

14. The tire valve according to claim 13, wherein further a second spring is disposed to urge the sealing element away from the sealing surface with a predetermined second force that is less than the predetermined force of the spring, and greater than a force required to separate the sealing element from the sealing surface against a pressure difference between the inside and outside of the wheel, in the absence of the urging of the spring with the predetermined force.

15. The tire valve according to claim 9, wherein further a hollow tubular cap disposed upon an end of the valve stem most distant from the valve base includes a member disposed to enable the valve actuator to displace the sealing element to a location removed from contact with the sealing surface, resulting in a normally open valve.

16. The tire valve according to claim 15, wherein further the cap member disposed to result in a normally open valve comprises at least one of a temperature sensitive and a pressure differential sensitive element, and upon at least one of a temperature or a pressure differential exceeding a predetermined level, the displacement member ceases to displace the sealing element away from the sealing surface.

17. The tire valve of claim 9, wherein the chamber is disposed to contain at least one of a compressed gas, a combination of gases, a pressurized gas in at least partly liquid form, a liquid material having at least one of an inert or a non inert pressurized gas, and a pressurizable fluid.

18. The tire valve of claim 9, wherein the wheel disposed to have a pneumatic tire is filled with at least one of compressed air, nitrogen, an inert gas, a reactive gas, and a combination of gases.

19. Means for controllably sealing a chamber comprising: a hollow stem having means for stem breakaway disposed at a location of the stem outside of the chamber, a body coupled to the hollow stem and having means for sealing a sealing surface against a sealing element disposed proximate to the sealing surface, and means for biasing the sealing surface with respect to the sealing element, wherein the sealing surface, the sealing element and the means for biasing are disposed within the chamber.

20. The means for sealing according to claim 19, wherein further the means for biasing further comprise at least one of a spring, an elastic material, a magnetic field, a fluid pressure differential, a remotely monitored electronic device, a remotely controlled electronic device, a remotely monitored electromechanical device, and a remotely controlled electromechanical device.

21. The means for sealing according to claim 19, wherein further the means for biasing is disposed to bias the sealing element against the sealing surface with a predetermined force.

22. The means for sealing according to claim 21, wherein further the means for biasing is sensitive to a pressure difference between a region inside of the chamber and a region outside of the chamber.

23. The means for sealing according to claim 22, wherein further a second means for biasing is disposed to bias the sealing element away from the sealing surface with a predetermined second force that is less than the predetermined force.

24. The means for sealing according to claim 21, wherein further the means for biasing is sensitive to a temperature in a region inside the chamber, and upon the temperature exceeding a predetermined value, ceases to bias the sealing element against the sealing surface with the predetermined force.

25. The means for sealing according to claim 19, wherein further the stem has actuator means disposed to be externally accessible to displace the sealing element with respect to the sealing surface.

26. The means for sealing according to claim 19, further comprising means disposed to displace the sealing element to a location removed from contact with the sealing surface disposed upon an end of the stem most distant from the chamber, resulting in a normally open valve.

27. The means for sealing according to claim 26, wherein further the means disposed to result in a normally open valve comprises at least one of a temperature sensitive and a pressure differential sensitive element, and upon at least one of a temperature or a pressure exceeding a predetermined level, ceases to displace the sealing element away from the sealing surface.

28. The mean for sealing according to claim 25, including a projection extending from an inner surface of the stem.

29. A valve for sealing a chamber comprising a valve stem, a valve body coupled to the valve stem and having a valve sealing surface, a valve sealing element disposed proximate to the sealing surface and an elastic material that biases the sealing surface with respect to the sealing element, wherein the sealing surface, the sealing element and the elastic member are disposed within the chamber, wherein the elastic member is disposed to bias the sealing element against the sealing surface with a predetermined force, and the elastic member is sensitive to a pressure difference between an inside region of the chamber and a region outside of the chamber, and upon the pressure difference exceeding a predetermined level, the elastic member ceases to bias the sealing element against the sealing surface with the predetermined force, wherein further a second elastic member is disposed to bias the sealing element away from the sealing surface with a predetermined second force that is less than the predetermined force of the elastic member, and greater than a force required to separate the sealing element from the sealing surface against the predetermined pressure difference between the inside of the chamber and the outside of the chamber, and against a remaining biasing of the elastic member.

30. A valve for sealing a chamber comprising a valve stem, a valve body coupled to the valve stem and having a valve sealing surface, a valve sealing element disposed proximate to the sealing surface, and an elastic material that biases the sealing surface with respect to the sealing element, wherein the sealing surface, the sealing element and the elastic member are disposed within the chamber, wherein the elastic member is disposed to bias the sealing element against the sealing surface with a predetermined force, and wherein the elastic member is sensitive to a temperature in a region inside the chamber, and upon the temperature exceeding a predetermined value, the elastic member ceases to bias the sealing element against the sealing surface with the predetermined force.

31. Means for controllably sealing a chamber comprising a hollow stem, a body coupled to the hollow stem and having means for sealing a sealing surface against a sealing element disposed proximate to the sealing surface, and means for biasing the sealing surface with respect to the sealing element, wherein the sealing surface, the sealing element and the means for biasing are disposed within the chamber, and the means for biasing is disposed to bias the sealing element against the sealing surface with a predetermined force, wherein further the means for biasing is sensitive to a temperature in a region inside the chamber, and upon the temperature exceeding a predetermined value, ceases to bias the sealing element against the sealing surface with the predetermined force.

32. A valve for sealing a chamber comprising a valve stem, a body coupled to the valve stem and having a valve sealing surface, a valve sealing element disposed proximate to the sealing surface, and an elastic material that biases the sealing surface with respect to the sealing element, wherein the sealing surface, the sealing element and the elastic member are disposed within the chamber, and wherein the valve stem includes a stem breakaway means disposed at a location of the stem outside the chamber for allowing the stem to breakaway from the valve.

33. Means for controllably sealing a chamber comprising a hollow stem, a body coupled to the hollow stem and having means for sealing a sealing surface against a sealing element disposed proximate to the sealing surface, and means for biasing the sealing surface with respect to the sealing element, wherein the sealing surface, the sealing element and the means for biasing are disposed within the chamber, and the means for biasing is disposed to bias the sealing element against the sealing surface with a predetermined force, wherein further the means for biasing is sensitive to a pressure in a region inside the chamber, and upon the pressure exceeding a predetermined value, ceases to bias the sealing element against the sealing surface with the predetermined force.

* * * * *